(12) United States Patent
Alber

(10) Patent No.: US 6,397,960 B2
(45) Date of Patent: Jun. 4, 2002

(54) TRANSPORTING DEVICE

(75) Inventor: Ulrich Alber, Albstadt (DE)

(73) Assignee: Alber Antriebstechnik GmbH, Albstadt (DE)

(*) Notice: Subject to any disclaimer, the term of this patent is extended or adjusted under 35 U.S.C. 154(b) by 0 days.

(21) Appl. No.: 09/793,950

(22) Filed: Feb. 27, 2001

(30) Foreign Application Priority Data

Mar. 4, 2000 (DE) .......................................... 100 10 775

(51) Int. Cl.[7] .............................................. B62D 51/06
(52) U.S. Cl. ...................... 180/8.2; 180/8.3; 280/47.21; 280/47.27
(58) Field of Search ........................... 180/8.1, 8.2, 8.3; 280/47.131, 47.21, 47.27, 5.2, 5.26, 5.32

(56) References Cited

U.S. PATENT DOCUMENTS

| | | | | |
|---|---|---|---|---|
| 1,376,717 A | * | 5/1921 | Mauger | 180/8.3 |
| 2,641,325 A | * | 6/1953 | Hoffman et al. | 180/8.2 |
| 3,269,478 A | * | 8/1966 | Joslyn | 180/8.2 |
| 4,550,924 A | * | 11/1985 | Alber | 280/47.27 |
| 5,052,237 A | * | 10/1991 | Reimann | 180/8.2 |
| 5,263,547 A | * | 11/1993 | Alber | 180/8.2 |
| 6,164,398 A | * | 12/2000 | Alber | 180/8.2 |

FOREIGN PATENT DOCUMENTS

| | | | | |
|---|---|---|---|---|
| DE | 1505834 | * | 8/1969 | 180/8.2 |
| DE | 2347990 | * | 4/1975 | 180/8.2 |
| DE | 37 13 564 C2 | | 5/1989 | |
| DE | 197 45 153 A1 | | 4/1999 | |
| JP | 5124546 | * | 5/1993 | 180/8.2 |

* cited by examiner

*Primary Examiner*—Daniel G. DePumpo
(74) *Attorney, Agent, or Firm*—Michael J. Striker

(57) ABSTRACT

A transporting device has wheels, a stair climbing unit having climbing legs, an electric motor provided for driving of the stair climbing unit, a drive shaft which is driven by the electric motor and is formed as a crank shaft located symmetrically to a central longitudinal axis of the device, the drive shaft having halves each rotatably supporting a first crank for the climbing leg and a second crank for the wheel.

8 Claims, 5 Drawing Sheets

TRANSPORTING DEVICE

BACKGROUND OF THE INVENTION

The present invention relates to a transporting device which has wheels and a stair climbing unit Which is driven by an electric motor and provided with climbing legs.

Transporting devices with step climbing units are known in many modifications. One of such transporting devices is disclosed in German patent document DE 37 13 564, and used in particular for a wheelchair. It is provided on both sides with a wheel pair whose wheels are turnable around special, jointly driven spaced parallel shafts. The shafts are connected each eccentrically with a hub disc, on which a rim of associated wheel is concentrically and rotatably supported.

The German patent document DE 197 45 153 discloses another transporting device which has wheels arranged on a frame and a stair climbing unit driven by an electric motor. The electric motor drives first eccentric lever, on which correspondingly a second eccentric lever is rotatably transported. It is rotatably supported with its end on supports which are linearly guided on the transporting device. Toothed gears or chains are arranged between the first and second eccentric levers. These transporting devices have a common feature that they require a relatively expensive construction with the use of chains or toothed gears. Moreover, a relatively great electric motor for the stair climbing unit is needed.

SUMMARY OF THE INVENTION

Accordingly, it is an object of present invention to provide a transporting device of the above mentioned general type, which eliminates the disadvantages of the prior art.

In keeping with these objects and with others which will become apparent hereinafter, one feature of present invention resides, briefly stated, in a transporting device in which the electric motor drives a drive shaft which is formed as a crankshaft symmetrical to the central longitudinal axis of the device, and on each half of the drive shaft on a crank climbing leg and on a further crank a wheel is rotatably supported.

Since the drive shaft formed at a crankshaft moves up and down both the climbing legs and the wheels, an expensive power transmission by means of chains or gears is dispensed with. The stair climbing unit can be produced in a price-favorable manner and also not susceptible to disturbances. A further advantage of the transporting device when compared with the German document DE 37 13 564 is that the climbing legs take up the load with smaller distances before the next stage. Thereby the horizontal extension between the supporting leg and the wheel set on the next step is shortened. The loading change at the hand grips is therefore substantially reduced.

The cranks for lifting and lowering of the wheels can enclose for example an angle of substantially 180° with the cranks for lifting and lowering of the climbing legs. When both the wheel cranks and the climbing leg cranks have the same length, the required torque and the motor power is minimal. When compared with the transporting device disclosed in German patent document DE 197 45 153, the required torque and the motor power is half as high. Finally, the transmission and the accumulator can be dimensioned correspondingly smaller. Thereby the weight or the total transporting device is reduced. Moreover, the accumulator can have a lower power and a shorter charging cycle.

For guiding the climbing legs on the device, they can be raisable lowerable, preferably along the guiding rails. Furthermore, for reducing the friction between the climbing legs and the guiding rails, the climbing legs can be guided preferably with guide rollers along the guiding rails.

Alternatively to a guidance on a rail, the climbing legs can be guided for example also by a guiding crank supported on a frame for lifting and lowering movements. This guiding crank which is arranged not on the crank shaft rotates parallel to the climbing leg cranks.

The guiding cranks and the cranks for lifting and loading movement of the climbing legs can be connected with one another by a chain or a transmission band. Thereby it is prevented that the guiding cranks and the climbing leg cranks are in an unstable position, when the guiding cranks and the climbing leg cranks are oriented in one line.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
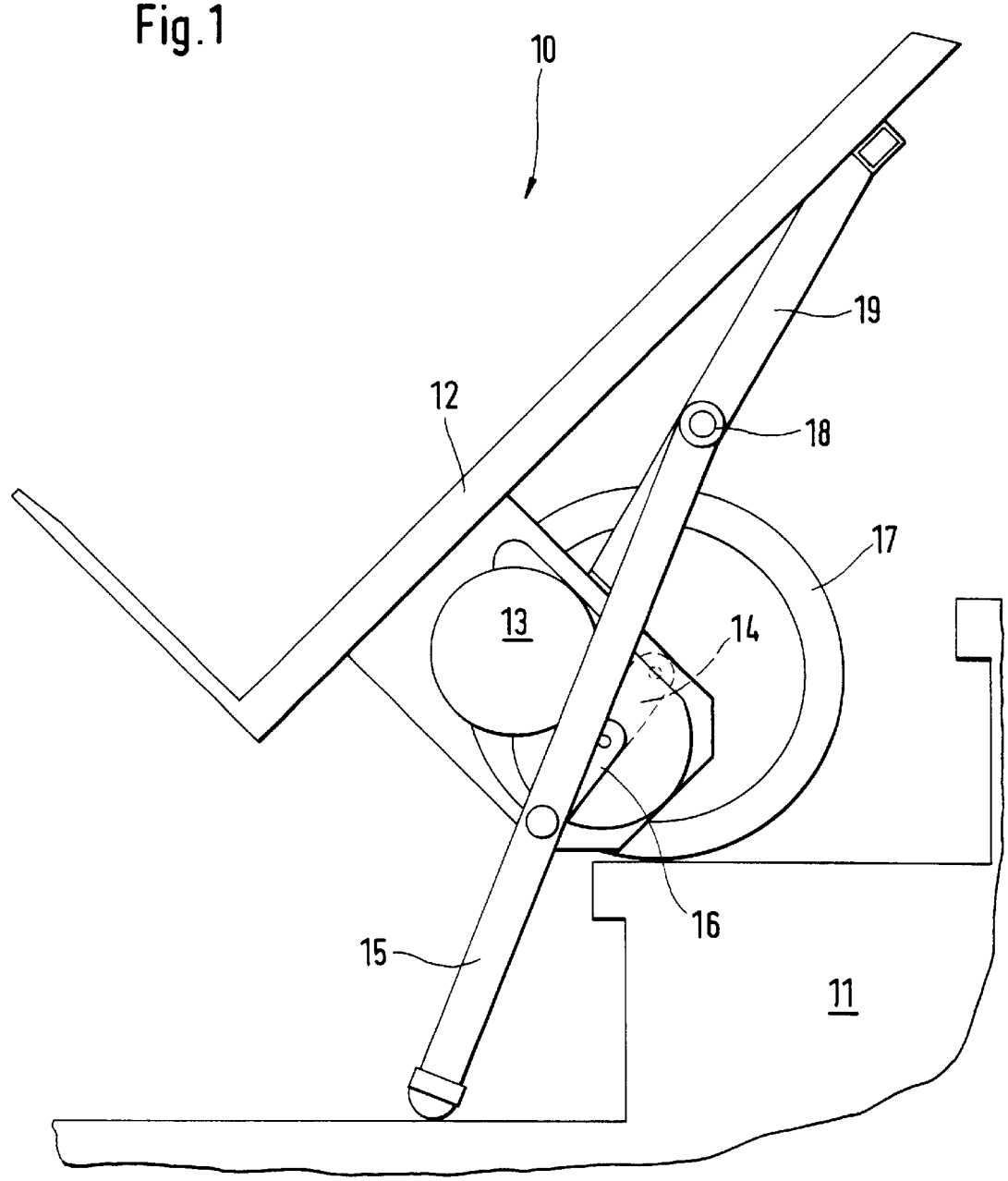
FIG. 1 is a side view of a transporting device with a stair climbing unit in accordance with the present invention.
Figure 3:
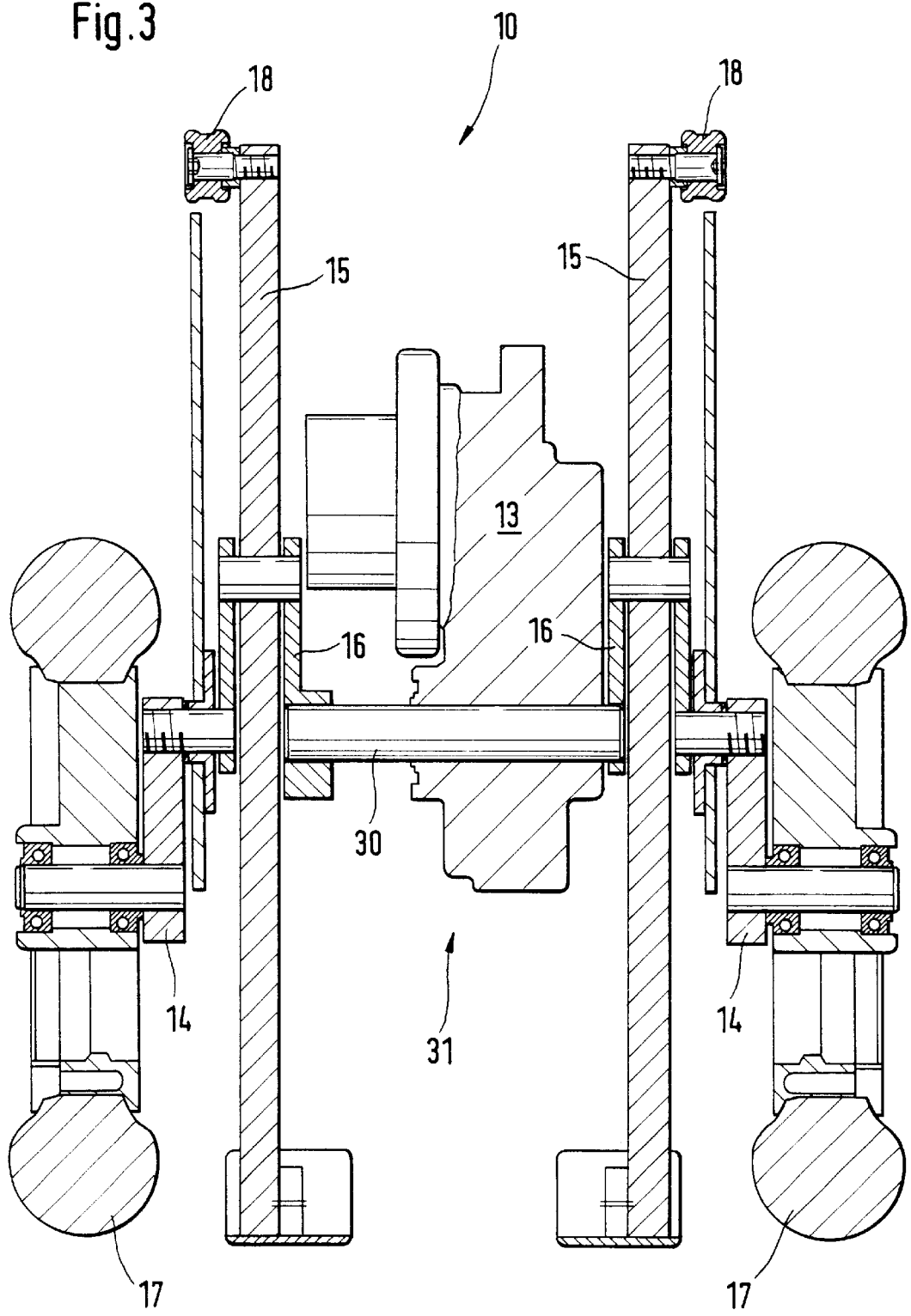
FIG. 3 is a view of the transporting device of FIG. 1 as seen from behind.

FIG. 1 shows a transporting device 10 with a step climbing unit 31 which is shown in detail in FIG. 3, during climbing of a stair step 1. The transporting device 10 has a frame 12 for receiving a not shown load. Furthermore, it has two wheels 17 and two climbing legs 15. Only one of them is shown on the side view. The wheel 17 is lifted and lowered by the electric motor 13 and a transmission, via the crank 14 and the climbing leg 15 via a crank 16. The climbing leg 15 is provided with a guiding roller 18 on its upper end, which is guided in the guiding rail 19.

Figure 2:
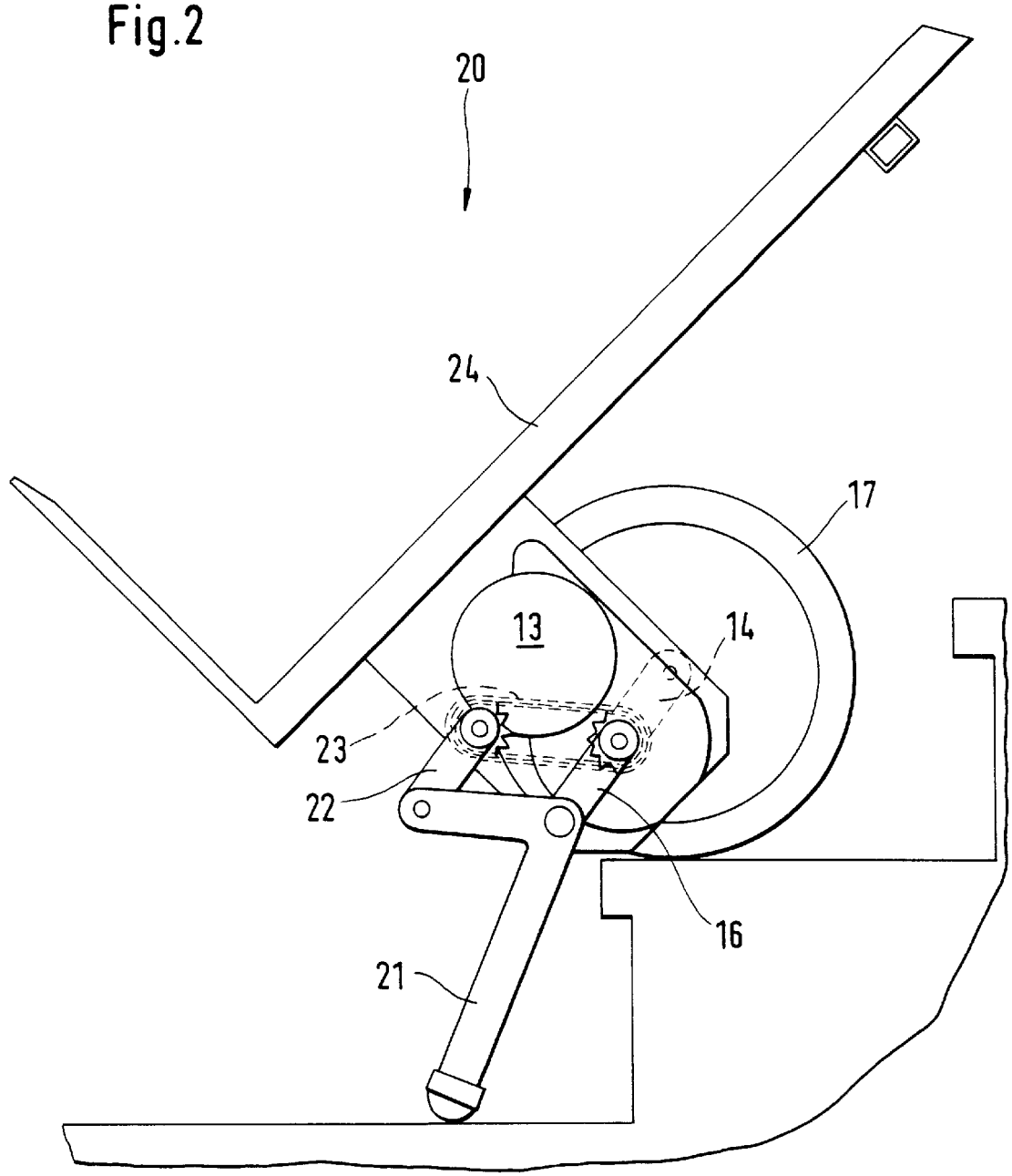
FIG. 2 is a view of second embodiment of transporting device with a stair climbing unit.

FIG. 2 shows an alternative embodiment of a transporting device 20. It is different from the transporting device 10 of FIG. 1 in the guidance of the climbing leg 21. The motor 13 moves the wheel 17 through the crank 14 and lifts and lowers the climbing leg 21 via the crank 16. Parallel to the climbing leg crank 16, a guiding crank 22 rotates. It is rotatably supported on a climbing leg 21 and on the frame 24 of the device 20 and holds the climbing leg 21 always in an approximately vertical position. The climbing leg crank 17 and the guiding crank 22 are coupled with one another via a chain 23. This coupling prevents that the cranks 16 and 22 can be blocked in a point in which the crank 16 and 22 are located on one line.

FIG. 3 shows a rear view of the stair climbing unit 31 of the transporting device 10 of FIG. 1. The step climbing unit 30 has a motor 13 in which the transmission is also integrated, and a shaft 30 which is formed as a crankshaft. The crankshaft 30 is formed symmetrically to the central longitudinal axis of the device 10. It has cranks 14 for lifting and lowering of the wheels 17, and cranks 16 for lifting and lowering of the climbing leg 13. The cranks 14 and 16 are arranged on the shaft 30 so that they are offset relative to one another by 180°. The climbing legs 15 are guided in their upper region by guiding rollers 18 in the guiding rails 19 which are shown in FIG. 1.

Figure 4:
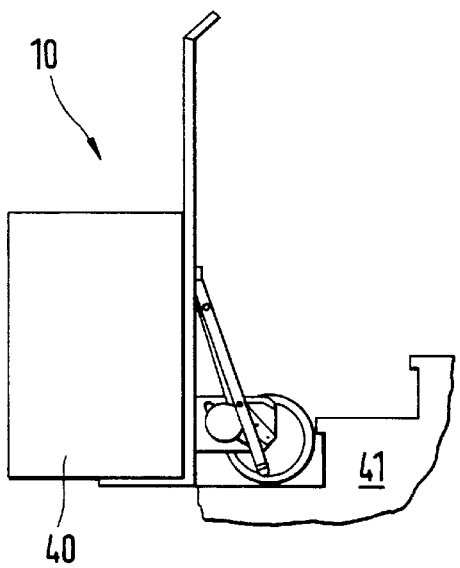
FIGS. 4–11 are side views of the transporting device of FIG. 1 in different positions during climbing a stair step.
Figure 6:
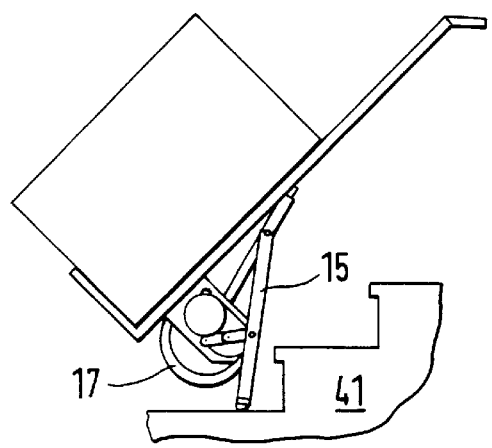
Figure 5:
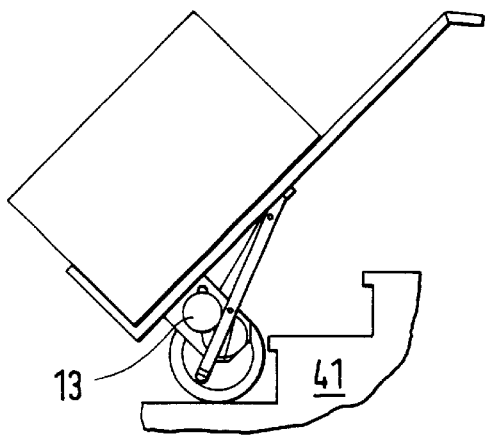
Figure 7:
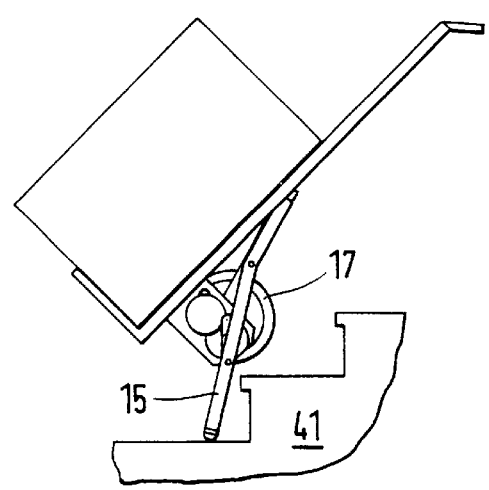
Figure 8:
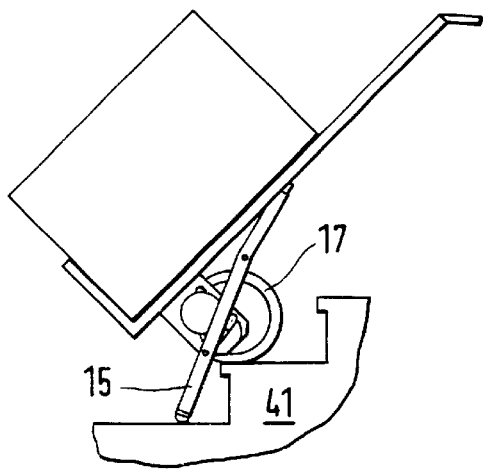

An operation of the transporting device 10 is illustrated in FIGS. 4–11. In FIG. 4 the transporting device 10 with a load 40 is in a stationary position. The wheel 17 is located directly before the edge of a stair step 41. In FIG. 5 the transporting device 10 is inclined and the motor is turned on. Thereby the crankshaft 30 is rotated. It produces the situation shown in FIG. 6, wherein the climbing leg 15 is moved downwardly and the transporting device 10 is lifted. Simultaneously, with downward movement of the climbing leg 15, the wheel 17 is moved upwardly. In FIG. 7 the climbing leg 15 is in its lowest point and the wheel 17 reaches its highest point. Thereby the lowest point of the wheel 17 is located over the upper edge of the next step of the stairs 1 to be climbed. In the position shown in FIG. 8 the wheel 17 is again moved somewhat downwardly and the climbing leg 15 is moved somewhat upwardly. Thereby the wheel 17 is placed on the step of the stairs 41. The climbing leg 15 still stands on the preceeding stair step.

Figure 9:
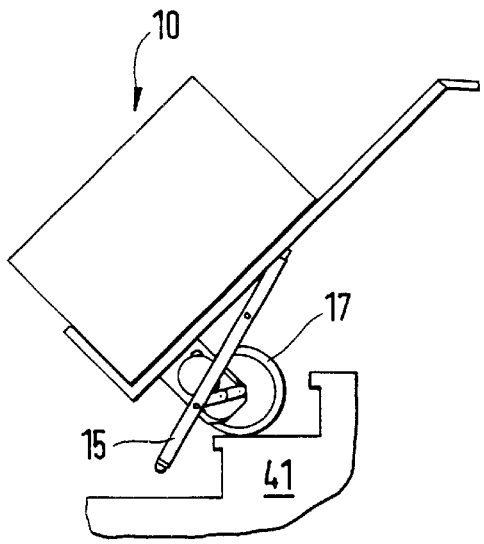
Figure 10:
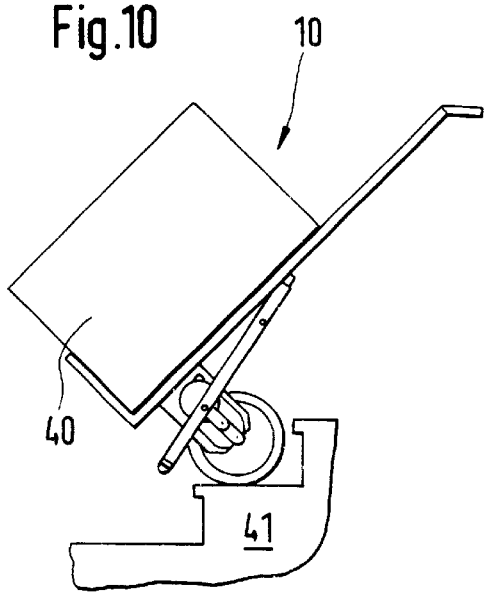
Figure 11:
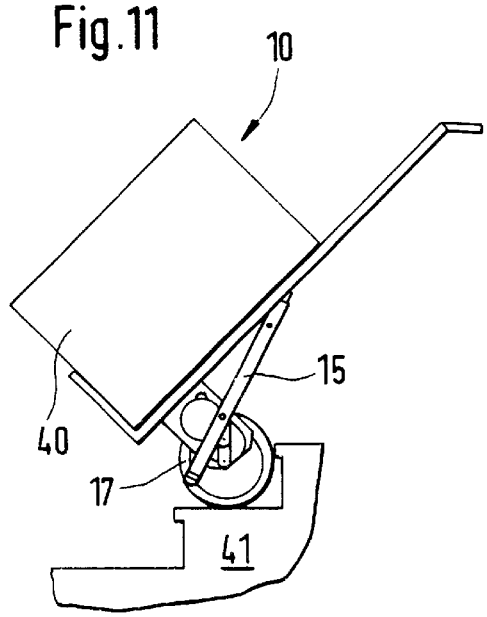

FIGS. 9–11 show how the climbing leg 15, due to the further rotation of motor 13 and the crankshaft 30, is moved upwards and the wheel 17 is moved further downwards. Thereby the transporting device 10 is lifted on the new step of the stairs 41 to be climbed. The climbing leg 15 is pulled in. FIG. 1 shows the climbing leg 15 in its upward apex point and the wheel 17 in its lower apex point. Thereby the transporting device 10 and the load 40 reach their highest point on the newly climbed step of the stairs 41. During climbing of the next step, the cycle shown in FIGS. 5–11 is repeated again.

When the transporting device 10 must move down the stairs, the rotary direction of the motor is switched over, and the movement sequence is performed in an order which is opposite to the order shown in FIGS. 5–11. When necessary, the device 10 can be also provided with a brake for the wheels 17.

It will be understood that each of the elements described above, or two or more together, may also find a useful application in other types of constructions differing from the types described above.

While the invention has been illustrated and described as embodied in transporting device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A transporting device, comprising wheels; a stair climbing unit having climbing legs; an electric motor provided for driving of said stair climbing unit; a drive shaft which is driven by said electric motor and is formed as a crank shaft located symmetrically to a central longitudinal axis of the device, said drive shaft having a first crank for said climbing legs and a second crank for said wheels, said cranks providing upward and downward movement of said wheels and said climbing legs.

2. A transporting device as defined in claim 1, wherein said first crank provides upward and downward movement of said wheels, said second cranks provides upward and downward movement of said climbing legs, said first and second cranks forming an angle approximately 180° with one another.

3. A transporting device as defined in claim 1; and further comprising a guiding rail along which said climbing legs are liftable and lowerable.

4. A transporting device as defined in claim 1; and further comprising a frame, and a guiding crank supported on said frame, said climbing legs being guidable by said guiding crank supported on said frame during lifting and lowering.

5. A transporting device as defined in claim 4; and further comprising means for connecting said guiding crank and said first crank for said climbing legs.

6. A transporting device, comprising wheels; a stair climbing unit having climbing legs; an electric motor provided for driving of said stair climbing unit; a drive shaft which is driven by said electric motor and is formed as a crank shaft located symmetrically to a central longitudinal axis of the device, said drive shaft having a first crank for said climbing legs and a second crank for said wheels; guiding rails along which said climbing legs are liftable and lowerable, said climbing legs being provided with guiding rolls which are guidable along said guiding rails.

7. A transporting device, comprising wheels; a stair climbing unit having climbing legs; an electric motor provided for driving of said stair climbing unit; a drive shaft which is driven by said electric motor and is formed as a crank shaft located symmetrically to a central longitudinal axis of the device, said drive shaft having a first crank for said climbing legs and a second crank for said wheels; a frame; a guiding crank supported on said frame, said climbing leg being guidable by said guiding crank supported on said frame during lifting and lowering; means for connecting said guiding crank and said first crank for said climbing legs, said connecting means including a chain.

8. A transporting device as defined in claim 7, wherein said connecting means include a transmission band.

* * * * *